United States Patent
Klein et al.

(10) Patent No.: US 11,164,041 B2
(45) Date of Patent: Nov. 2, 2021

(54) SEMI-SUPERVISED LEARNING WITH INFRASTRUCTURE

(71) Applicant: Toyota Research Institute, Inc., Los Altos, CA (US)

(72) Inventors: Gregory J. Klein, Cupertino, CA (US); Matthew Amacker, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 173 days.

(21) Appl. No.: 16/540,797

(22) Filed: Aug. 14, 2019

(65) Prior Publication Data
US 2021/0049409 A1    Feb. 18, 2021

(51) Int. Cl.
*G06K 9/62* (2006.01)
*H04N 5/247* (2006.01)
(Continued)

(52) U.S. Cl.
CPC ....... *G06K 9/6256* (2013.01); *G06K 9/00771* (2013.01); *G06K 9/3208* (2013.01); *H04N 5/247* (2013.01); *H04W 4/44* (2018.02)

(58) Field of Classification Search
CPC ............ G06K 9/6263; G06K 9/00791; G06K 9/6259; G06K 9/6221; G06K 9/6242;
(Continued)

(56) References Cited

U.S. PATENT DOCUMENTS

| 10,043,103 B2 | 8/2018 | Dodballapur et al. |
| 2018/0060725 A1 | 3/2018 | Groh et al. |
| 2019/0385025 A1* | 12/2019 | McMichael ........ G06K 9/00791 |

FOREIGN PATENT DOCUMENTS

| CN | 102072702 B | 11/2015 |
| JP | 2015064800 A | 4/2015 |

(Continued)

OTHER PUBLICATIONS

Weng, Ming Fang; Tang, Nick C.; Lin, Yen-Yu; Liao, Hong-yuan Mark, "Visual Knowledge Transfer among Multiple Cameras for People Counting with Occlusion Handling," https://projet.liris.cnrs.fr/imagine/pub/proceedings/ACM-MULTIMEDIA-2012/mm/p439.pdf; Published/Accessed: 2012.

(Continued)

*Primary Examiner* — Duy M Dang
(74) *Attorney, Agent, or Firm* — Dinsmore & Shohl, LLP

(57) ABSTRACT

A system includes a first camera having a first field of view of an environment and a first machine learning model associated with the first camera, where the first machine learning model is trained to identify object or semantic information from image data captured by the first camera. The system further includes a second camera having a second field of view of the environment. An electronic controller communicatively coupled to the first camera and the second camera is configured to receive object or semantic information from the image data captured by the first camera as identified by the first machine learning model and train the second machine learning model, where training (Continued)

data utilized for training the second machine learning model comprises the object or semantic information identified by the first machine learning model.

20 Claims, 5 Drawing Sheets

(51) Int. Cl.
  *H04W 4/44* (2018.01)
  *G06K 9/32* (2006.01)
  *G06K 9/00* (2006.01)
(58) Field of Classification Search
  CPC .... G06K 9/6267; G06K 9/627; G06K 9/6282; G06K 9/0063; G06K 9/00637; G06K 9/62615; G06K 9/6219; G06K 9/00228; G06T 7/0002; G06T 7/0004; G06T 7/12; G06T 7/11; G06T 7/90; G06T 7/55; G06T 3/0068; G06T 15/04; G06F 16/5854; A63F 13/655; A63F 13/00; A63F 13/327; A63F 13/213; A63F 13/25; A63F 13/32; A63F 13/332; A63F 13/335
  See application file for complete search history.

(56) References Cited

FOREIGN PATENT DOCUMENTS

WO 2017116635 A1 7/2017
WO 2019010147 A1 1/2019

OTHER PUBLICATIONS

Tang, Nick C.; Weng, Tang Ming; Lin, Yen-Yu; Liao, Hong-yuan Mark, "Cross-Camera Knowledge Transfer for Multiview People Counting," URL: https://www.researchgate.net/publication/267101687_Cross-Camera_Knowledge_Transfer_for Multiview People_Counting, Published/Accessed: 2014.
Berry, Sara; Van Horn, Grant; and Perona, Pietro, "Recognition in Terra Incognita" https://arxiv.org/pdf/1807.04975.pdf; Published: Jul. 25, 2018.

* cited by examiner

SEMI-SUPERVISED LEARNING WITH INFRASTRUCTURE

TECHNICAL FIELD

The present specification generally relates to systems and methods for training camera systems to detect object and semantic information. More specifically, the present specification relates to systems and methods for utilizing object and semantic information obtained from one camera system to train another camera system.

BACKGROUND

Camera systems are widely used for a variety of functions, including surveillance, vehicle navigation and autonomous control, object detection and semantic information determination by robotic systems and the like. Image data captured by a camera may be processed and analyzed by a machine-learning model (e.g., a neural network trained to carry out a particular task). Machine learning models are generally trained using a set of predefined training data, such as a set of images that is manually or automatically labeled with semantic information and where objects are identified by pixel clustering, bounding boxes, or other techniques. Such training methods may be sufficient for camera systems that are employed on vehicles where object detection and semantic information must be determined from image data where the background environment continuously changes. As such, overfitting the machine learning model to particular environments may not be advantageous. However, for fixed systems that collect image data from an environment where the background features infrequently change, overfitting the model to the environment may be advantageous.

SUMMARY

In one embodiment, a system includes a first camera having a first field of view of an environment and a first machine learning model associated with the first camera, where the first machine learning model is trained to identify object or semantic information from image data captured by the first camera. The system further includes a second camera having a second field of view of the environment, where at least a portion of the second field of view of the second camera is different from the first field of view of the first camera and a second machine learning model associated with the second camera. An electronic controller communicatively coupled to the first camera and the second camera is configured to: receive object or semantic information from the image data captured by the first camera as identified by the first machine learning model and train the second machine learning model, where a set of training data utilized for training the second machine learning model comprises the object or semantic information identified by the first machine learning model from the image data captured by the first camera.

In some embodiments, a method includes receiving image data from a first camera having a first field of view of an environment; identifying, with a first machine learning model associated with the first camera, object or semantic information from the first image data; receiving image data from a second camera having a second field of view of the environment, where at least a portion of the second field of view of the second camera is different from the first field of view of the first camera; training a second machine learning associated with the second camera to identify object or semantic information from the image data captured by the second camera, where the second machine learning model is trained using training data comprising the object or semantic information identified by the first machine learning model from the image data captured by the first camera.

In some embodiments, a camera system includes a camera having a field of view of an environment; a machine learning model associated with the camera and configured to identify object or semantic information from image data captured by the camera; and an electronic controller communicatively coupled to the camera. The electronic controller is configured to receive object or semantic information from an adjacent camera system implementing a machine learning model to identify the object or semantic information from image data captured by the adjacent camera system and train the machine learning model associated with the camera to identify the object or semantic information from image data captured by the camera, where training data utilized for training the machine learning model comprises the object or semantic information identified from the image data captured by the adjacent camera system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
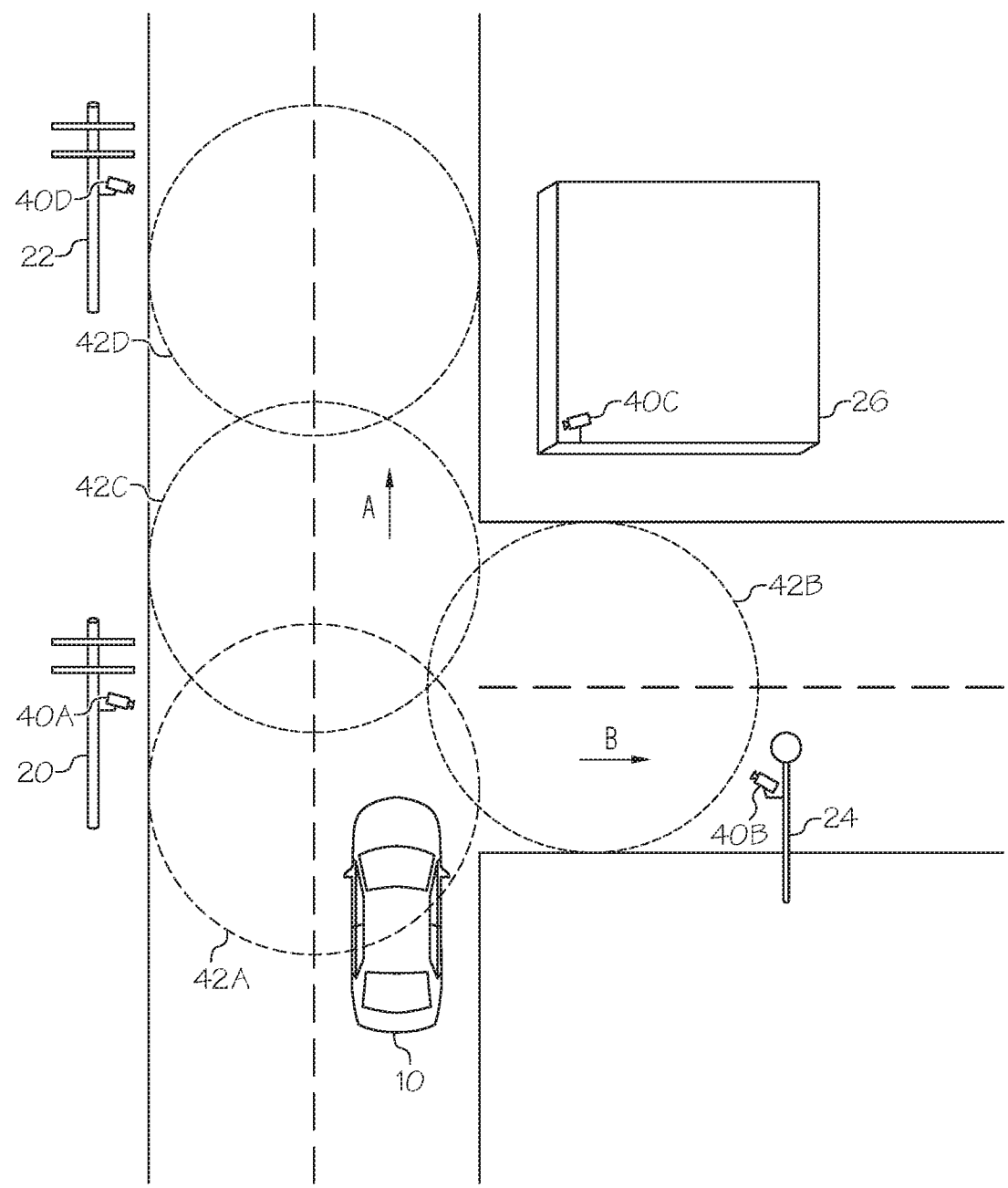
FIG. 1 depicts an illustrative environment having multiple cameras deployed for monitoring the environment according to one or more embodiments shown and described herein.

Embodiments of the present disclosure include systems and methods that provide a camera infrastructure where semantic knowledge learned by one camera is utilized to train and calibrate adjacent cameras. In some embodiments, a network of cameras may be installed on poles (e.g., stoplights, street lamps, street signs, etc.). The cameras are focused to view portions of a roadway or other ground level environments. The cameras may have a fixed location and fixed field of view.

A plurality of camera systems, each including at least one camera, may be communicatively coupled to each other. The field of view of the camera systems may overlap with each other or may be spatially related from each other through a calibration process. That is, a first camera system may be positioned to view an intersection and a second camera system may be positioned to view a road leading to and from the intersection. The first camera system and second camera system may be calibrated such that each is configured to know the position of the other camera system. That is, when an object passes through the intersection viewed mainly by the first camera system and continues along the road leading from the intersection, the second camera system (i.e., viewing the road leading from the intersection) may utilize calibration data and object recognition information of the first camera system to calibrate the second camera system and/or train the machine learning model of the second camera system to identify objects and/or other semantic information.

The second camera system is capable of utilizing information from the first camera system based on knowledge of the first camera system's positional relationship (i.e., relative location) to the second camera system. For example, the second camera system may have knowledge that the first camera system is configured to capture image data of objects prior to it entering the field of view of the second camera system (i.e., from the intersection). That is, through the spatial awareness or mapping of each camera system with respect to at least one adjacent camera system, training data from one camera system may be shared with the adjacent camera system to improve training of the machine learning model configured to carry out computer vision tasks such as object recognition and/or semantic segmentation.

In some embodiments, a system includes a first camera system including a first camera that is positioned on a pole to view a first portion of an environment. The first camera system is trained using labeled training data, including, for example, image and/or video data annotated by humans. The training data may be image and/or video data captured by the camera of the first portion of the environment or may include training data that is not specific to a location or an environment. A first machine-learning model associated with the first camera learns to identify objects and/or features within the image and/or video data captured by the first camera.

The system further includes a second camera system including a second camera. The second camera may also be installed on a pole with a field of view that overlaps that of the first camera or may have a field of view that is adjacent to and/or partially overlapping the field of view of the first camera. When the first camera system identifies an object within the image data or video data captured by the first camera, the presence of the object, semantic label for the object, and any other identified attributes may be communicated to the second camera system that is configured to analyze image data and/or video data captured by the second camera. The second camera system utilizes the information from the first camera system to train and/or improve a second machine-learning model for computer vision tasks of the second camera within the environment of the second camera system such that the second camera system may independently classify and/or detect objects and features captured in image data by the second camera. As used herein, image data may refer to either or both still image data, a series of still images, or video data captured by a camera.

In some embodiments, a graph or 3D spatial environment (e.g., a map of the environment) may be established where edges of the field of view of the plurality of cameras are defined. LIDAR systems, global positioning systems, and/or accelerometers may be implemented to determine the pose of the cameras during installation and recalibration so that what one camera views (or relevant portions thereof) may be utilized in combination with what another camera views to assist with training the latter's machine learning model and/or recalibrating the latter's intrinsic and/or extrinsic camera characteristics from time to time. It is understood that by training the machine learning model with image data from one or more adjacent trained cameras (e.g., the first camera), the other cameras within the camera network may be trained and overfit to features within their particular environments. That is, by overfitting a camera to a particular location, the machine learning model may more readily or with greater precision classify and detect objects passing through the environment because portions of the environment may be learned as static objects/features (i.e., as a result of overfitting) while the dynamic features are more readily noticed and recognized.

For example, the machine-learning model may more efficiently perform operations such as semantic segmentation. In other words, when a machine-learning model for a camera system is overfit to a particular location, certain features within the environment captured in the image data of the camera may be discounted/ignored and processing resources may be focused on classifying and/or detecting the dynamic/new features in the scene.

By way of a non-limiting example, a first camera (camera A) may be trained offline with data from its scene so that it overfits to its installed location. It can be assumed that the machine-learning model associated with camera A is more accurate than the other machine learning models associated with the other cameras before they are trained to their environments. As a result, labels generated by the machine learning model of camera A can be projected into adjacent cameras B and E, for example, for training their respective machine learning models. Such sharing of information can propagate through the system of cameras and mutually improve the machine learning models and calibration factors of each of the cameras.

In some embodiments, the system of cameras may generate image data of a city environment that may be transmitted to one or more vehicles traveling in the area to improve autonomous vehicle navigation, guidance systems that may predict future changes in traffic patterns, provide more advanced alerts to a driver of the presence of objects that may not be visible by vehicle sensors because they are not in their field of view or the like.

The following will now describe these systems and methods in more detail with reference to the drawings and where like numbers refer to like structures.

Referring now to FIG. 1, an illustrative environment having multiple cameras configured to capture image data of various portions of the environment is depicted. FIG. 1 depicts one example implementation of the camera systems described herein. Cameras 40A, 40B, 40C, and 40D may be mounted on telephone poles 20, 22, lampposts 24, buildings 26, or any other stationary objects in an environment. Each of the cameras 40A, 40B, 40C, and 40D may include a field of view. For example, the fields of view of cameras 40A, 40B, 40C, and 40D may include fields of view 42A, 42B, 42C, and 42D, respectively. As depicted, adjacent cameras may include overlapping fields of views with each other.

In some embodiments, which will described in more detail herein, a first camera 40A captures image data of the environment within field of view 42A. The image data may include a vehicle 10 driving along the road. A machine learning model (e.g., a trained neural network) configured to identify objects and determine semantic information associated with the object may be employed by a camera system to analyze the image data captured by the first camera 40A. In embodiments described herein, the object recognition information and/or the semantic information that is determined by the camera system analyzing the image data captured by the first camera 40A may be communicated to adjacent camera systems for purposes such as training respective specific machine learning models. As used herein, the term "training" refers to teaching, updating, or refining a machine learning model.

The pose of each of the cameras 40A, 40B, 40C, and 40D is defined by the location and orientation of the camera 40A, 40B, 40C, and 40D within the environment. That is, the location may be defined by an (X, Y, Z) value with respect to a reference point within the environment. The reference point may be the location of a particular camera or any location within the environment. In some embodiments, global positioning system (GPS) coordinates may be used to define the location of each of the cameras 40A, 40B, 40C, and 40D. A GPS may be included with each of the cameras 40A, 40B, 40C, and 40D. Furthermore, the orientation of each of the cameras 40A, 40B, 40C, and 40D may be determined automatically through accelerometers coupled to each of the cameras 40A, 40B, 40C, and 40D. The accelerometers may be used to determine the roll, pitch, and yaw orientation of each of the cameras 40A, 40B, 40C, and 40D once installed. Together, the location and the orientation values define the pose of the cameras 40A, 40B, 40C, and 40D. It is understood that other methods of determining the location and/or orientation of the cameras 40A, 40B, 40C, and 40D may be used.

In some embodiments, each of the cameras 40A, 40B, 40C, and 40D may include a pose defined by (X, Y, Z, Roll, Pitch, Yaw) values. Additionally, each of the cameras 40A, 40B, 40C, and 40D includes a field of view 42A, 42B, 42C, and 42D, respectively. The system may generate a map or model of an environment using the pose of each of the cameras 40A, 40B, 40C, and 40D and their respective fields of view 42A, 42B, 42C, and 42D. The map or model of the environment may be used as a reference by the system to determine which combinations of cameras 40A, 40B, 40C, and 40D are adjacent to each other and which may be used to train a neighboring camera system.

In some embodiments, the system may analyze the pose of each of the cameras to determine where the respective camera is located in the environment and what portion of the environment the camera is viewing. In some embodiments, image data from each of the cameras 40A, 40B, 40C, and 40D may be captured and analyzed to determine which of the cameras 40A, 40B, 40C, and 40D include overlapping views of portions of the environment. As such, adjacency of the cameras 40A, 40B, 40C, and 40D may be determined. By determining adjacency between the cameras 40A, 40B, 40C, and 40D, the system may determine which camera or cameras 40A, 40B, 40C, and 40D may receive object and/or semantic information determined by one for training another.

With reference still to FIG. 1, the first camera 40A captures image data of the environment within field of view 42A. The image data captured by the first camera 40A includes a vehicle 10 traveling along the road in the direction indicated by arrow A. Based on the adjacency of the cameras 40A, 40B, 40C, and 40D communicatively coupled to the system, the system may determine that the object and semantic information determined from analysis of the image data captured by the first camera 40A may be transmitted to the one or more electronic controllers communicatively coupled to cameras 40B and/or 40C.

The one or more electronic controllers communicatively coupled to cameras 40B and/or 40C may receive and utilize the object and semantic information, which was determined by the trained machine learning model associated with the first camera 40A for training at least one of the machine learning models associated with camera 40B and/or 40C. For example, as the vehicle 10 traverses the road in the direction of arrow A, the camera 40C will begin to capture image data of the vehicle 10. For at least the frames of the image data where the vehicle 10 is in the overlapping fields of view of the first camera 40A and the camera 40C, the object and/or semantic information determined by the machine learning model that is associated with the first camera 40A is also applicable for use in training the machine learning model associated with the camera 40C. In other words, the system, through the determined pose information for each of the cameras 40A, 40B, 40C, and 40D, is capable of determining where fields of view from one camera (e.g., 40A) overlaps with another camera (e.g., 40C). As such, object and/or semantic information that is determined by a trained machine learning model associated with camera 40A may be utilized to train the machine learning model associated with another camera 40C.

In continuing the progression of the vehicle 10 in the direction of arrow A, the object and/or semantic information determined by the machine learning model that is associated with the first camera 40A, which was utilized by the system to train the machine learning model associated with camera 40C may further be used to train the machine learning model associated with camera 40D since the field of view 42C of camera 40C overlaps with the field of view 42D of camera 40D. In other words, there is at least continuous coverage of the environment along the road in the direction of arrow A through image data captured by cameras 40A, 40C, and 40D. The system through the pose information and optionally, the generated model of the environment may determine one or more positional relationships between the cameras 40A, 40B, 40C, and 40D where object and/or semantic information can be shared to train machine learning models associated with adjacent cameras.

In some embodiments, the system may employ object tracking algorithms for tracking the direction and movement of an object through its field of view of the environment. For example, the system, in analyzing the image data captured from the first camera 40A, may determine that the vehicle 10 makes a turn at the cross street that is in the field of view 42A of camera 40A. That is, the vehicle 10 changes course from heading in the direction of arrow A to head in the direction indicated by arrow B in FIG. 1. In such a case, the object and/or semantic information determined by the machine learning model that is associated with the first camera 40A may be utilized by the electronic controller communicatively coupled to camera 40B for training the machine learning model that is associated with the camera 40B. In other words, the knowledge that image data from the first camera 40A contains a vehicle 10 in overlapping frames of the image data of the environment captured by camera 40B may be used to train the machine learning model associated with camera 40B to identify and label the vehicle 10 captured by image data therein.

Figure 2:
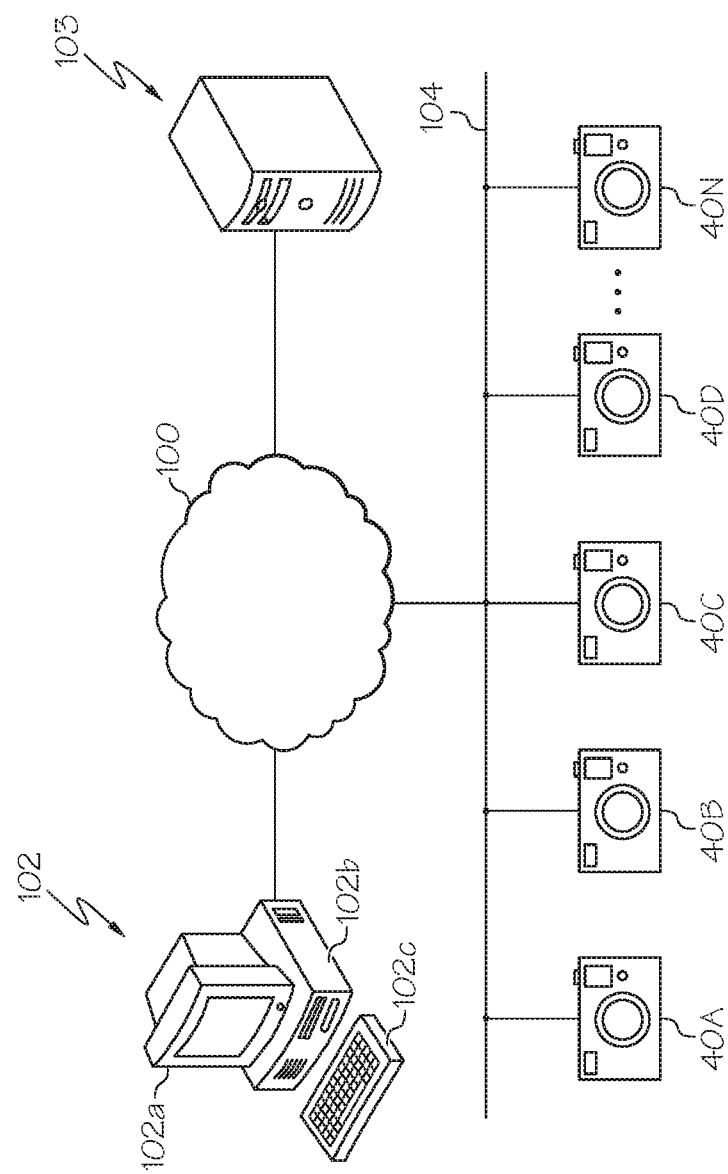
FIG. 2 schematically depicts an example system having more than one camera communicatively connected together enabling information sharing and training according to one or more embodiments shown and described herein.
Figure 3:
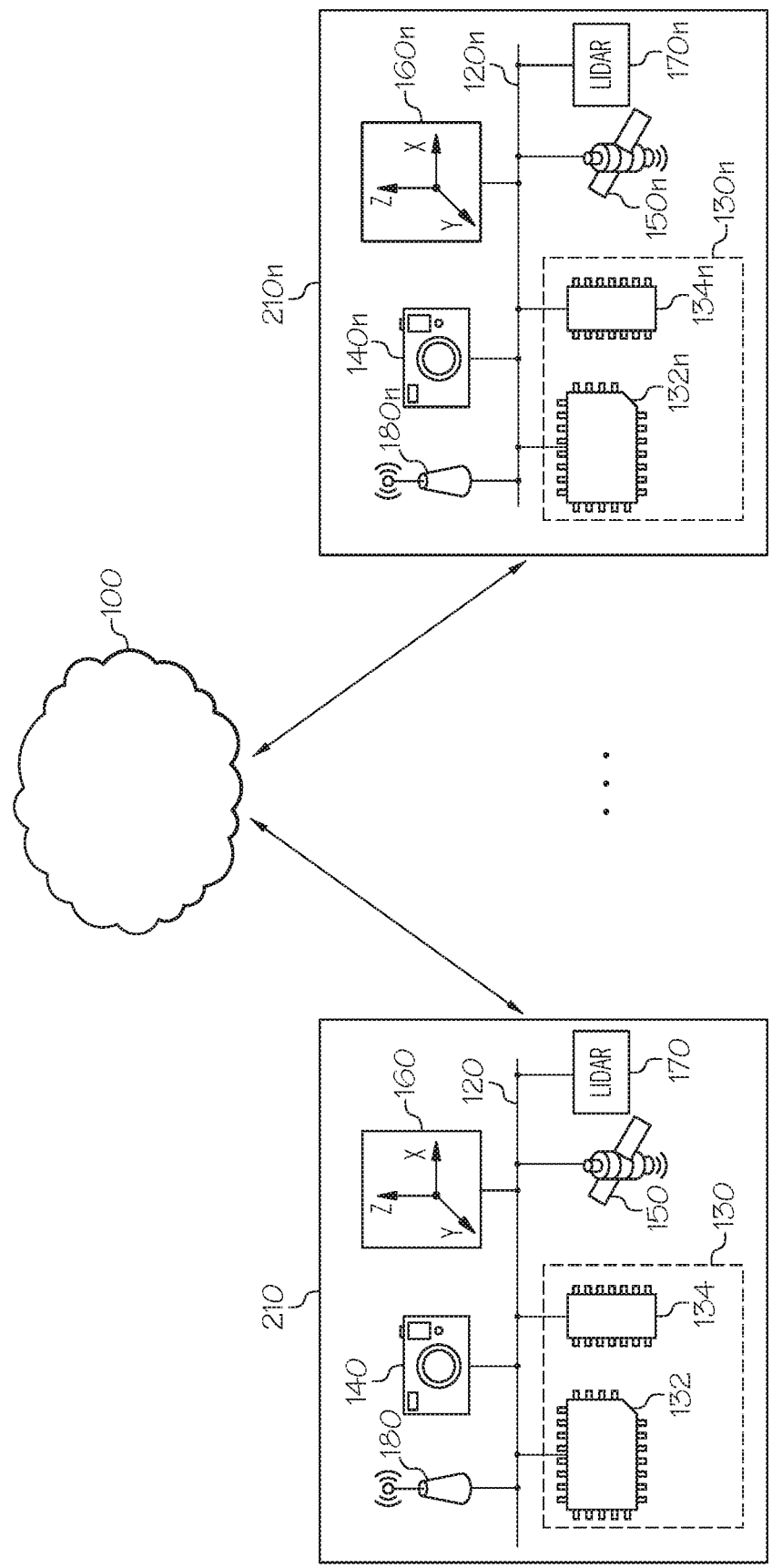
FIG. 3 schematically depicts another example system having more than one camera system communicatively connected together enabling information sharing and training according to one or more embodiments shown and described herein.

It should now be understood that object and/or semantic information determined from image data captured by one camera may be shared among adjacent camera systems for training and/or calibration purposes. The following two figures, FIGS. 2 and 3, provide two example system architectures that may be used to perform the embodiments described herein. FIG. 2 depicts an example system having more than one camera communicatively connected together enabling information sharing and training. In such embodiments, the system may include a computing device 102, a server 103, and multiple cameras 40A, 40B, 40C, 40D, . . . , 40N each communicatively coupled through a communication bus 104 and a network 100.

The network 100 may include a wide area network, such as the internet, a local area network (LAN), a mobile communications network, a public service telephone network (PSTN) and/or other network and may be configured to electronically connect a computing device 102, a server 103 for processing image data captured by one or more of the cameras 40A, 40B, 40C, 40D, . . . , 40N. The communication bus 104 may be formed from any medium that is capable of transmitting a signal such as, for example, conductive wires, conductive traces, optical waveguides, or the like. The communication bus 104 may also refer to the expanse in which electromagnetic radiation and their corresponding electromagnetic waves traverses. Moreover, the communication bus 104 may be formed from a combination of mediums capable of transmitting signals. In one embodiment, the communication bus 104 comprises a combination of conductive traces, conductive wires, connectors, and buses that cooperate to permit the transmission of electrical data signals to components such as processors, memories, sensors, input devices, output devices, and communication devices. Accordingly, the communication bus 104 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 104 communicatively couples the various components of the system. As used herein, the term "communicatively coupled" means that coupled components are capable of exchanging signals with one another such as, for example, electrical signals via conductive medium, electromagnetic signals via air, optical signals via optical waveguides, and the like.

The computing device 102 may include a display 102a, a processing unit 102b and an input device 102c, each of which may be communicatively coupled to together and/or to the network 100. The computing device 102 may be used to interface with the image data captured by one or more of the cameras 40A, 40B, 40C, 40D, . . . , 40N, configure the pose information of the one or more of the cameras 40A, 40B, 40C, 40D, . . . , 40N, generate a map or model of the environment, or any other system level configuration tasks required to implement the system described herein. The computing device 102 may also be utilized to interface with a server 103 to develop, update, and/or repair the one or more machine learning models for identifying object and/or semantic information from image data captured by the one or more the cameras 40A, 40B, 40C, 40D, . . . , 40N.

The one or more cameras 40A, 40B, 40C, 40D, . . . , 40N may be communicatively coupled to the communication bus 104 and to the computing device 102 and/or the server 103. The one or more cameras 40A, 40B, 40C, 40D, . . . , 40N may be any device having an array of sensing devices (e.g., pixels) capable of detecting radiation in an ultraviolet wavelength band, a visible light wavelength band, or an infrared wavelength band. The one or more cameras 40A, 40B, 40C, 40D, . . . , 40N may have any resolution. The one or more cameras 40A, 40B, 40C, 40D, . . . , 40N may be an omni-directional camera, or a panoramic camera. In some embodiments, one or more optical components, such as a mirror, fish-eye lens, or any other type of lens may be optically coupled to each of the one or more cameras 40A, 40B, 40C, 40D, . . . , 40N.

In embodiments implemented using the example architecture depicted in FIG. 2, cameras 40A, 40B, 40C, 40D, . . . , 40N are implemented in a network node arrangement where the processing of image data captured by each of the cameras 40A, 40B, 40C, 40D, . . . , 40N is carried out by one or more servers 103 communicatively coupled to the cameras 40A, 40B, 40C, 40D, . . . , 40N. That is, while each of the devices is illustrated in FIG. 2 as a single piece of hardware, this is also an example. More specifically, the computing device 102 and the server 103 may represent a plurality of computers, servers, databases, and the like.

Referring now to FIG. 3, another example system having more than one camera system 210 and 210n communicatively connected together enabling information sharing and training is depicted. While FIG. 3 depicts only two camera systems 210 and 210n, it is understood that the system may include more camera systems communicatively coupled to each other. Camera system 210 will now be described in detail, however, like numbers refer to like structures in camera system 210n. In some embodiments, the camera system 210 may include an electronic controller 130 having a processor 132 and a memory component 134. The camera system 210 may also include a communication bus 120, a camera 140, a GPS 150, an accelerometer 160, a LIDAR system 170, and/or network interface hardware 180. The camera system 210 may be communicatively coupled to a network 100 by way of the network interface hardware 180. The components of the camera system 210 are communicatively coupled to each other via the communication bus 120. The various components of the camera system 210 and the interaction thereof will be described in detail below.

The communication bus 120 may be a communication bus 104 as described above with reference to FIG. 2. The electronic controller 130 may be any device or combination of components comprising a processor 132 and the memory component 134. The electronic controller 130 of the camera system 210 may be configured to implement a machine learning model, an example of which will be described with reference to FIG. 4. The processor 132 of the camera system 210 may be any device capable of executing the machine-readable instruction set stored in the memory component 134. Accordingly, the processor 132 may be an electric controller, an integrated circuit, a microchip, a field programmable gate array, a computer, or any other computing device. The processor 132 is communicatively coupled to the other components of the camera system 210 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 3 includes a single processor 132 per camera system 210, other embodiments may include more than one processor 132 per camera system 210.

The memory component 134 of the camera system 210 is coupled to the communication bus 120 and communicatively coupled to the processor 132. The memory component 134 may be a non-transitory computer readable memory and may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as machine language that may be directly executed by the processor 132, or assembly language, object-oriented programming (OOP), scripting languages, microcode, etc., that may be compiled or assembled into machine readable instructions and stored in the memory component 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the camera system 210 depicted in FIG. 3 includes a single memory component 134, other embodiments may include more than one memory components 134.

The camera 140 may be a camera 40A, 40B, 40C, 40D, . . . , 40N as described above with reference to FIG. 2.

Referring still to FIG. 3, the camera system 210 may further include a GPS 150. The GPS 150 is coupled to the communication bus 120 and communicatively coupled to the electronic controller 130. The GPS 150 is capable of generating location information indicative of a location of the camera system 210. The GPS signal communicated to the electronic controller 130 via the communication bus 120 may include location information comprising a NMEA message, a latitude and longitude data set, altitude information, a street address, a name of a known location based on a location database, or the like. Additionally, the GPS 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

The camera system 210 may include an accelerometer 160 for determining the orientation of a camera 140 so that the electronic controller 130 may determine the pose of the camera 140 and subsequently the field of view of the environment for which the camera system 210 is installed within. The accelerometer 160 may be a 3-axis accelerometer 160. The accelerometer 160 may be any device or instrument capable of measuring acceleration. The accelerometer 160, when coupled to the camera 140, may determine the acceleration due to gravity along its one or more sensitive axes. The accelerometer 160 may transmit the measured accelerations as signals to the electronic controller 130 so that the orientation of the camera (i.e., the roll, pitch, and yaw) of the camera may be determined.

Still referring to FIG. 3, in some embodiments, the camera system 210 may include a LIDAR system 170. The LIDAR system 170 is communicatively coupled to the communication bus 120 and the electronic controller 130. The LIDAR system 170 is used in a light detection and ranging system that uses pulsed laser light to measure distances from the LIDAR system 170 to objects that reflect the pulsed laser light. The LIDAR system 170 may be made of solid-state devices with few or no moving parts, including those configured as optical phased array devices, where prism-like operation permits a wide field-of-view without the weight and size complexities associated with a traditional rotating LIDAR sensor. The LIDAR system 136 is particularly suited to measuring time-of-flight, which in turn can be correlated to distance measurements with objects that are within a field-of-view of the LIDAR system 170. By calculating the difference in return time of the various wavelengths of the pulsed laser light emitted by the LIDAR system 170, a digital 3-D representation of a target or environment may be generated. The pulsed laser light emitted by the LIDAR system 170 may be operated in or near the infrared range of the electromagnetic spectrum, with one example having emitted radiation of about 905 nanometers. Sensors such as LIDAR system 170 can be used to generate a map of the environment, which in turn may be used to identify the positional relationship between the multiple camera systems 210 and 210n in the environment.

Still referring to FIG. 3, the camera system 210 may also include network interface hardware 180 that is communicatively coupled to the electronic controller 130 via the communication bus 120. The network interface hardware 180 may include any wired or wireless networking hardware, such as a modem, LAN port, Wi-Fi card, WiMax card, mobile communications hardware, and/or other hardware for communicating with a network and/or other devices and systems. For example, the camera system 210 may be communicatively coupled to a network 100 by way of the network interface hardware 180.

As described above with reference to at least FIG. 1, a first camera system 210 may include a trained machine learning model implemented by the electronic controller 130 for determining object and/or semantic information from image data captured by the camera 140. Other sensors, such as GPS 150, accelerometer 160, LIDAR system 170 or the like may be physically and communicatively coupled to the camera 140, where the camera 140 is installed in the environment to generate pose information and other mapping data that can be used to determine adjacency with another camera system 210n. Furthermore, the object and/or semantic information determined by the trained machine learning model of the first camera system 210 may be transmitted to and utilized by a second camera system 210n to train the machine learning model implemented by an electronic controller 130n associated with the second camera 140n. Pose information may also be shared between camera systems 210, 210n to determine portions of the environment which each camera 140 to 140n capture image data from and to determine overlapping fields of view between one or more of the cameras 104 to 140n.

Figure 4:
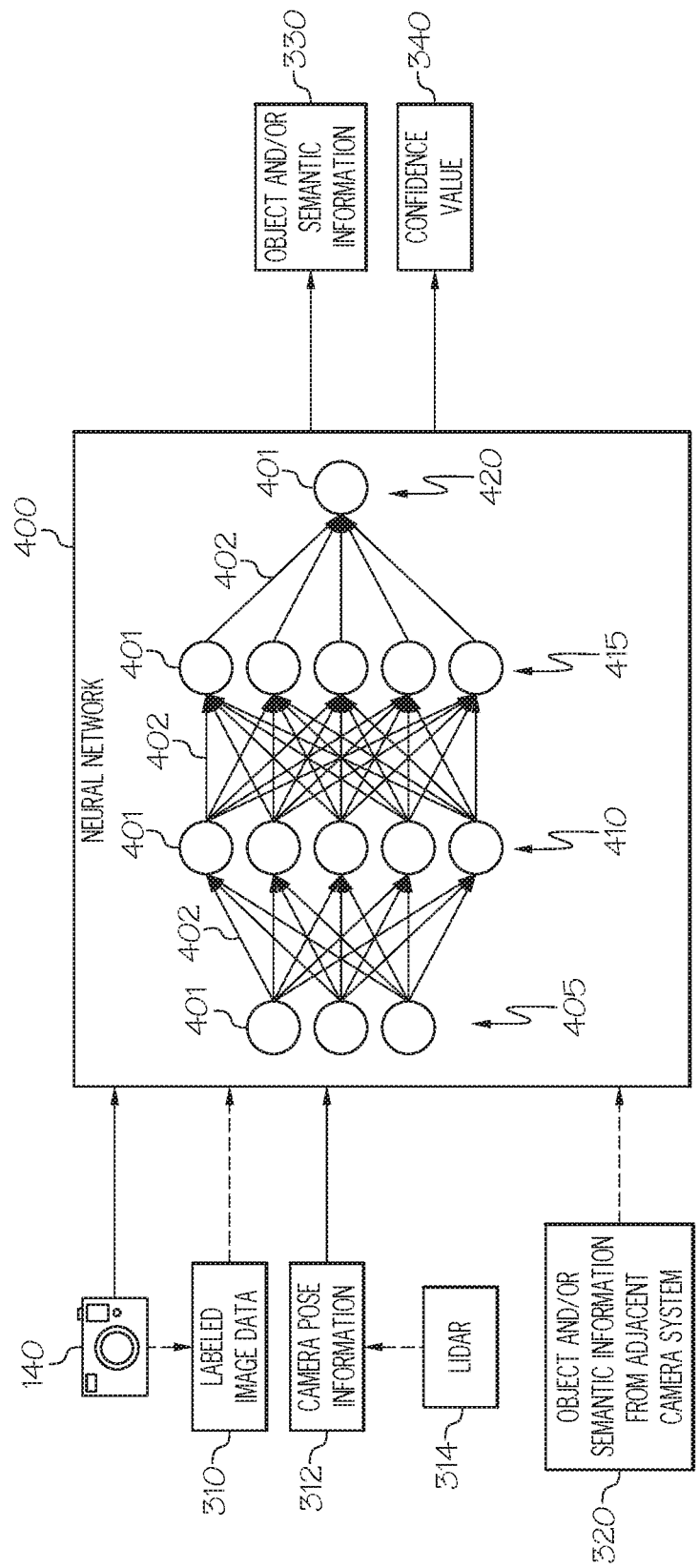
FIG. 4 depicts an illustrative diagram for a neural network model for training a camera system to identify objects and determine semantic information from image data captured by a camera according to one or more embodiments shown and described herein.

Turning to FIG. 4, an illustrative diagram for a neural network model for training a camera system to identify objects and determine semantic information from image data captured by a camera is depicted. In some embodiments, the neural network 400 may include one or more layers 405, 410, 415, 420, having one or more nodes 401, connected by node connections 402. The one or more layers 405, 410, 415, 420 may include an input layer 405, one or more hidden layers 410, 415, and an output layer 420. The input layer 405 represents the raw information that is fed into the neural network 400. For example, image data from a camera 140, labeled image data 310 generated from image data captured by the camera 140, camera pose information 312, LIDAR or other sensor data 314, and object and/or semantic information from an adjacent camera system 320, may be input into the neural network 400 at the input layer 405. The neural network 400 processes the raw information received at the input layer 405 through nodes 401 and node connections 402. The one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when a neural network is learning, the neural network is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge that is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0) and 2) adaptive networks which are able to change their weights (i.e., dW/dt not=0). In fixed networks, the weights are fixed a priori according to the problem to solve.

In order to train a neural network to perform some task, adjustments to the weights are made in such a way that the error between the desired output and the actual output is reduced. This process may require that the neural network computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network, hence "back propagation". Once the EA has been computed for a unit, it is straight forward to compute the EW for each incoming connection of the unit. The EW is the product of the EA and the activity through the incoming connection. It should be understood that this is only one method in which a neural network is trained to perform a task.

Referring back to FIG. 4, the neural network 400 may include one or more hidden layers 410, 415 that feed into one or more nodes 401 of an output layer 420. There may be one or more output layers 420 depending on the particular output the neural network 400 is configured to generate. For example, the neural network 400 may be trained to generate object and/or semantic information 330 and a confidence value 340 associated with the object and/or semantic information 330. The object and/or semantic information 330 that is determined by a trained neural network 400 may be used as training data (e.g., object and/or semantic information from an adjacent camera system 320) for training a neural network model 400 associated with another camera or camera system.

Figure 5:
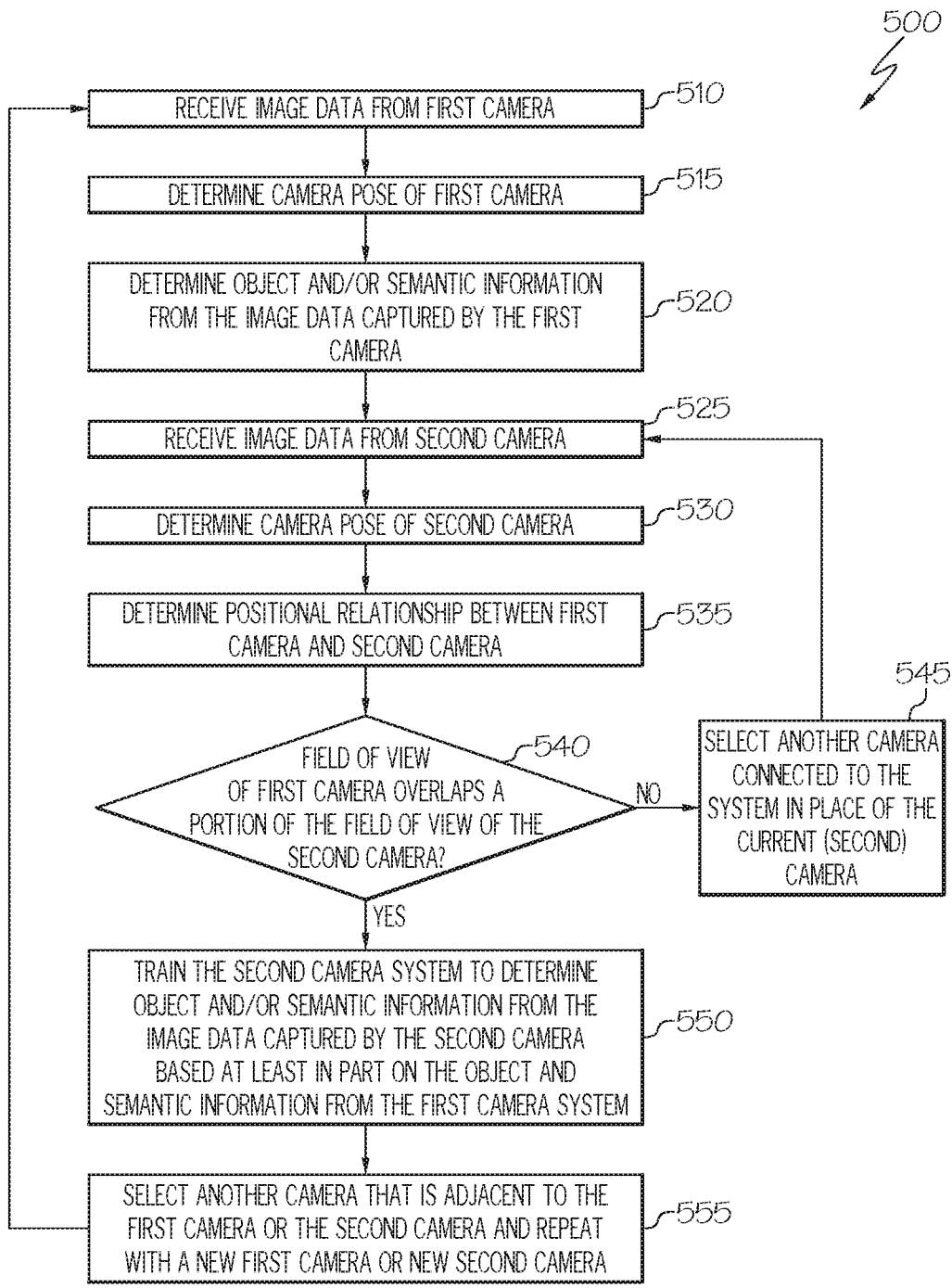
FIG. 5 depicts an illustrative flow diagram for collecting image data and training a camera system based on training data generated by an adjacent camera system within an environment according to one or more embodiments shown and described herein.

Turning to FIG. 5 an illustrative flow diagram 500 for collecting image data and training a camera system based on training data generated by an adjacent camera system within an environment is depicted. While more than one process for collecting image data and training a machine learning model of a camera system based on training data generated by an adjacent camera system may exist, the flow diagram 500 depicts at least one example process. It should be understood that while the following process is described with reference to a single electronic controller (e.g., by a server 103 depicted and described with reference to FIG. 2), the process may be implemented across a number of electronic controllers (e.g., each of the electronic controllers 130, and 130n associated with different camera systems 210 and 210n forming a network of camera systems (the "system") as depicted and described with reference to FIG. 3). Furthermore, some embodiments may include an implementation that include elements of both architectures described and depicted with reference to FIGS. 2 and 3.

Referring specifically to the flow diagram 500, the electronic controller, at block 510, receives image data from a first camera (e.g., camera 140). The image data may be still images, a sequence of still images, or video data captured by the camera. At block 515, the pose of the first camera (e.g., camera 140) is determined. To determine the pose of the first camera (or any camera), the electronic controller may receive pose information (e.g., (X, Y, Z, Roll, Pitch, Yaw) values) that are input through a computing device or determined from sensor data communicated to the electronic controller. For example, an accelerometer (e.g., accelerometer 160) may provide Roll, Pitch, and Yaw values based on the orientation of the accelerometer coupled to the camera. Moreover, a GPS (e.g., GPS 150) or similar localization device may determine the location of the camera in an environment. The location of the camera may be parameterized with respect to a reference location such as the location of another camera or some other location.

At block 520, the electronic controller, for example, through a machine learning model, determines object and/or semantic information from the image data captured by the first camera. In some embodiments, object detection and/or semantic segmentation algorithms may be utilized to determine object and/or semantic information. As such, the object detection and/or semantic segmentation algorithms associated with each of the camera systems may be updated based on information determined by another camera system in a similar way as described above with reference to training the machine learning model associated with a particular camera system.

At block 525, the electronic controller may receive image data from the second camera (e.g., 140*n*). The electronic controller may also determine the pose of the second camera at block 530. Based on the pose of the first camera and the pose of the second camera, the electronic controller determines the positional relationship between the first camera and the second camera at block 535. The positional relationship between the first camera and the second camera may further inform the electronic controller of the fields of view of each camera and whether any of the fields of view overlap. At block 540, the electronic controller determines whether the field of view of the first camera at least partially overlaps with the field of view of the second camera. If they do (yes at block 540), then the electronic controller, at block 550, utilizes the object and/or semantic information obtained from analysis of the image data captured by the first camera to train the machine learning model associated with the second camera. Subsequently, at block 555 the electronic controller may select another camera that is adjacent to the first camera or the second camera and repeat the process with respect to the other adjacent camera.

In the event the field of view of the first camera and the field of view of the second camera do not contain an overlapping portion (no at block 540), the electronic controller determines whether there is another adjacent camera system for which to train at block 545. If so, then the process returns to block 525 where the other adjacent camera now replaces the second camera described in the flow diagram 500.

It should be understood that steps of the aforementioned process may be omitted or performed in a variety of orders while still achieving the object of the present disclosure. Additionally, the process may be performed with more than two camera systems. It is contemplated that any number of camera systems meeting the criteria described herein may be included in the system and methods of training described herein.

It should now be understood that embodiments described herein are directed to systems and methods that provide a camera infrastructure where semantic knowledge learned by one camera is utilized to train and calibrate adjacent cameras. In some embodiments, a network of cameras may be installed on poles (e.g., stoplights, street lamps, street signs, etc.). The cameras are focused to view portions of a roadway or other ground level environments. The cameras may have a fixed location and fixed field of view. The plurality of camera systems may be communicatively coupled to each other. The field of view of one or more of the plurality of camera systems may overlap with each other or may be spatially related from each other through a calibration process. The object and/or semantic information determined by one camera system may be utilized to train an adjacent camera system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a first camera having a first field of view of an environment;
   a first machine learning model associated with the first camera, wherein the first machine learning model is trained to identify object or semantic information from image data captured by the first camera;
   a second camera having a second field of view of the environment, wherein at least a portion of the second field of view of the second camera is different from the first field of view of the first camera;
   a second machine learning model associated with the second camera; and
   an electronic controller communicatively coupled to the first camera and the second camera, the electronic controller is configured to:
      receive object or semantic information from the image data captured by the first camera as identified by the first machine learning model; and
      train the second machine learning model to determine object or semantic information from image data captured by the second camera, wherein a set of training data utilized for training the second machine learning model comprises the object or semantic information identified by the first machine learning model from the image data captured by the first camera.

2. The system of claim 1, wherein a portion of the first field of view overlaps with the second field of view.

3. The system of claim 1, further comprising:
   a third camera having a third field of view of the environment, wherein at least a portion of the third field of view of the third camera is different from the second field of view of the second camera;
   a third machine learning model associated with the third camera; and
   a second electronic controller communicatively coupled to the third camera, the second electronic controller is configured to:
      receive object or semantic information from the image data captured by the second camera as identified by the second machine learning model; and
      train the third machine learning model, wherein a set of training data utilized for training the third machine learning model comprises the object or semantic information identified by the second machine learning model from the image data captured by the second camera.

4. The system of claim 1, further comprising at least one of an accelerometer or a global positioning system coupled to the first camera, and wherein the electronic controller is further configured to:
   determine a pose of the first camera.

5. The system of claim 4, further comprising at least one of an accelerometer or a global positioning system coupled to the second camera, and wherein the electronic controller is further configured to:
   determine a pose of the second camera; and
   determine a positional relationship between the first camera and the second camera.

6. The system of claim 1, wherein the environment is a city environment.

7. The system of claim 1, wherein the electronic controller is further configured to:
receive image data from the second camera; and
determine object or semantic information from the image data captured by the second camera using the trained second machine learning model.

8. The system of claim 7, wherein the electronic controller is further configured to:
transmit the object or semantic information determined from the image data captured by the second camera to a vehicle.

9. A method comprising:
receiving image data from a first camera having a first field of view of an environment;
identifying, with a first machine learning model associated with the first camera, object or semantic information from the first image data;
receiving image data from a second camera having a second field of view of the environment, wherein at least a portion of the second field of view of the second camera is different from the first field of view of the first camera; and
training a second machine learning associated with the second camera to identify object or semantic information from the image data captured by the second camera, wherein the second machine learning model is trained using training data comprising the object or semantic information identified by the first machine learning model from the image data captured by the first camera.

10. The method of claim 9, wherein a portion of the first field of view overlaps with the second field of view.

11. The method of claim 9, further comprising:
receiving image data from a third camera having a third field of view of the environment, wherein at least a portion of the third field of view of the third camera is different from the second field of view of the second camera; and
training a third machine learning associated with the third camera to identify object or semantic information from the image data captured by the third camera, wherein the third machine learning model is trained using training data comprising the object or semantic information identified by the second machine learning model from the image data captured by the second camera.

12. The method of claim 9, further comprising determining a pose of the first camera.

13. The method of claim 12, further comprising:
determining a pose of the second camera; and
determining a positional relationship between the first camera and the second camera.

14. The method of claim 9, further comprising:
receiving image data from the second camera; and
determining object or semantic information from the image data captured by the second camera using the trained second machine learning model.

15. The method of claim 14, further comprising:
transmitting the object or semantic information determined from the image data captured by the second camera to a vehicle.

16. A camera system comprising:
a camera having a field of view of an environment;
a machine learning model associated with the camera and configured to identify object or semantic information from image data captured by the camera; and
an electronic controller communicatively coupled to the camera, the electronic controller configured to:
receive object or semantic information from an adjacent camera system implementing a machine learning model to identify the object or semantic information from image data captured by the adjacent camera system; and
train the machine learning model associated with the camera to identify the object or semantic information from image data captured by the camera, wherein training data utilized for training the machine learning model comprises the object or semantic information identified from the image data captured by the adjacent camera system.

17. The camera system of claim 16, wherein a portion of the field of view overlaps with an adjacent field of view of the adjacent camera system.

18. The camera system of claim 16, wherein the environment is a city environment.

19. The camera system of claim 16, wherein the electronic controller is further configured to:
receive image data from the camera; and
determine object or semantic information from the image data captured by the camera utilizing the trained machine learning model.

20. The camera system of claim 19, wherein the electronic controller is further configured to:
transmit the object or semantic information determined from the image data captured by the camera to a vehicle.

* * * * *